(12) United States Patent
Gessner

(10) Patent No.: US 8,383,741 B2
(45) Date of Patent: Feb. 26, 2013

(54) PARTICULATE FLOW CONTROL PROCESS

(75) Inventor: Mark A. Gessner, Houston, TX (US)

(73) Assignee: Ineos USA LLC, Lisle, IL (US)

( * ) Notice: Subject to any disclaimer, the term of this patent is extended or adjusted under 35 U.S.C. 154(b) by 353 days.

(21) Appl. No.: 12/655,684

(22) Filed: Jan. 5, 2010

(65) Prior Publication Data

US 2011/0108119 A1    May 12, 2011

(30) Foreign Application Priority Data

Nov. 9, 2009   (EP) .................. 09175380

(51) Int. Cl.
 *C08F 2/00* (2006.01)
 *B65G 53/30* (2006.01)
 *G05D 7/00* (2006.01)
(52) U.S. Cl. ............ 526/88; 526/919; 406/12; 137/4
(58) Field of Classification Search ............ 526/88, 526/919; 422/111; 137/4; 406/12
 See application file for complete search history.

(56) References Cited

U.S. PATENT DOCUMENTS

| | | | | |
|---|---|---|---|---|
| 2,917,465 | A | * 12/1959 | Begley | .............. 502/6 |
| 3,846,394 | A | * 11/1974 | Mitacek | .............. 526/79 |
| 5,098,667 | A | 3/1992 | Young et al. | |
| 6,908,971 | B2 | 6/2005 | Burns et al. | |

FOREIGN PATENT DOCUMENTS

| | | |
|---|---|---|
| WO | WO 2004/054700 A1 | 7/2004 |
| WO | WO 2005/077522 A1 | 8/2005 |

\* cited by examiner

*Primary Examiner* — Fred M Teskin
(74) *Attorney, Agent, or Firm* — James J. Drake

(57) ABSTRACT

The present invention relates to the control of flow of a particulate feed to a reactor, and in particular provides a process for providing a slurry of particulate matter to a reactor, comprising providing a slurry comprising said particulate matter and diluent, and passing said slurry to the inlet of a reactor feed pump from where it is then pumped to the reactor, characterized in that a stream of additional diluent is also passed to the inlet of the reactor feed pump, the reactor feed pump is operated at an essentially constant volumetric flow rate, and the amount of particulate matter in slurry passed into the reactor is adjusted by adjusting the flow.

11 Claims, 1 Drawing Sheet

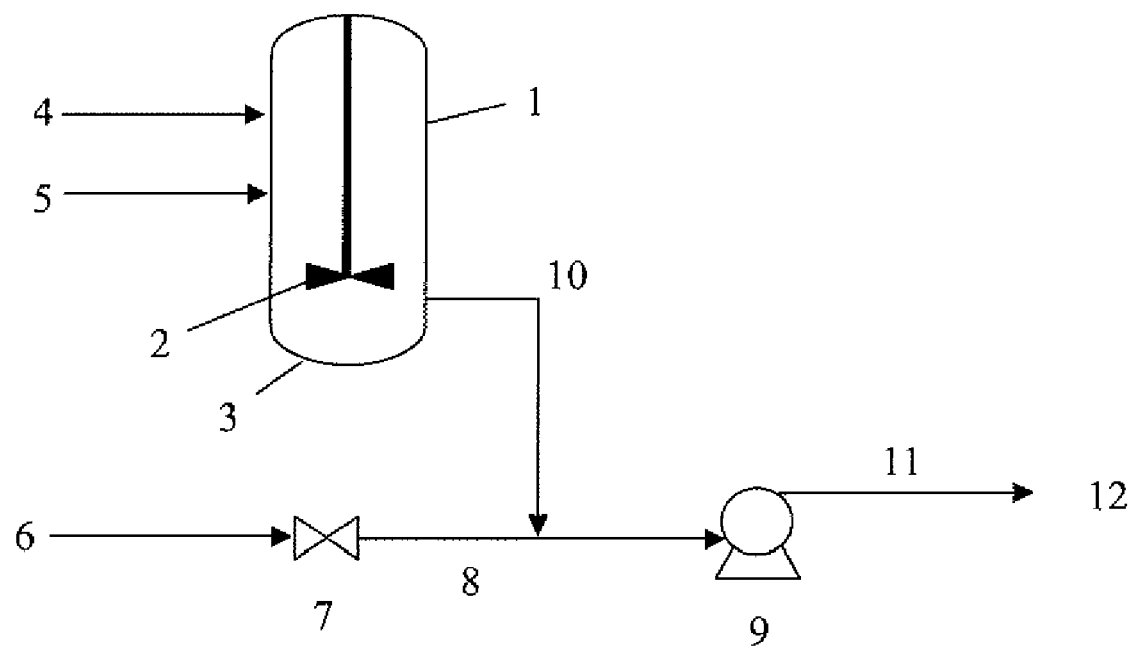

PARTICULATE FLOW CONTROL PROCESS

The present invention relates to the control of flow of a particulate feed to a reactor.

In a typical slurry polymerization reaction, monomer, diluent and a particulate catalyst are fed to a reactor where the monomer is polymerized. The diluent does not react but the quantity of diluent supplied to the reactor is typically utilized to control solids concentration in the reactor and also to provide a convenient mechanism for introducing the particulate solid catalyst into the reactor. In gas phase reactions too, the particulate catalyst can be transported to the reactor using an inert liquid diluent as carrier. In gas phase reactions the inert diluent introduced is typically introduced to optimise the heat removal from the reaction system.

It is well known to pump a slurry of catalyst in mineral oil or other diluent into a reactor wherein the speed of the pump is varied to adjust the catalyst flow to the reactor. Examples of such a process include WO 2004/54700, U.S. Pat. No. 6,980,971, WO 2005/77522 and U.S. Pat. No. 5,098,667.

WO 2004/54700, for example, describes a particulate flow control process. The process of WO 2004/54700 provides a continuous flow of particulate material to a reactor based on the concentration of the slurry in a mixing tank. A number of techniques for controlling the amount of catalyst introduced into the reactor are taught, including the optional use of a pump and optional further dilution, for example in a buffer vessel between the slurry tank and the reactor. The flow of the catalyst slurry exiting the slurry tank is controlled via a control valve.

U.S. Pat. No. 6,980,971 describes a catalyst slurry feeding assembly for a polymerisation reactor. In the process of U.S. Pat. No. 6,980,971 the flow rate of the catalyst slurry pumped to the reactor is measured and the pumping rate adjusted as required based on the flow measurement to ensure the required amount of the slurry is Pumped to the reactor.

WO 2005/77522 also relates to a process for preparing and supplying catalyst slurry to a polymerisation reactor. In the process of WO 2005/77522, concentrated catalyst slurry is diluted to form dilute catalyst slurry, which is pumped to the reactor using a membrane pump. The pump flow rate is controlled based on the concentration of a reactant in the reactor.

U.S. Pat. No. 5,098,667 discloses a similar process to WO 2005/77522 wherein dilute slurry is formed in a mix tank to provide a source of particulate material from which a continuous flow of solid particles into a reactor can be established. The flow rate of the dilute slurry from the mix tank into the reactor is continuously adjusted so as to provide a desired flow rate of solid particles contained in the dilute slurry, in response to a computed value of the mass flow rate of the solid catalyst particles contained in the dilute slurry.

There has now found an improved process for the control of flow of particulate materials to a reactor.

Thus, in a first aspect, the present invention provides a process for providing a slurry of particulate matter to a reactor, comprising:
  a. providing a slurry comprising said particulate matter and diluent, and
  b. passing said slurry to the inlet of a reactor feed pump from where it is then pumped to the reactor,
  characterised in that:
  i) a stream of additional diluent is also passed to the inlet of the reactor feed pump,
  ii) the reactor feed pump is operated at an essentially constant volumetric flow rate, and
  iii) the amount of particulate matter passed into the reactor is adjusted by adjusting the flow rate of said stream of additional diluent to the inlet of the reactor feed pump.

The slurry of particulate matter is preferably a slurry of a catalyst. Preferably the reactor is a polymerisation reactor for the polymerisation of olefins, such as ethylene or propylene, and most preferably is a slurry polymerisation reactor. The most preferred type of a reactor is a slurry loop reactor. Correspondingly, the slurry of particulate matter is preferably a slurry of a polymerisation catalyst. Suitable catalysts are well known and include Phillips ("chromium"), Ziegler and metallocene catalysts.

In the process of the first aspect of the present invention the reactor feed pump is operated at an essentially constant volumetric flow rate. By this is meant that the flow rate is not deliberately adjusted. (In such a scenario any noise or other variation in flow rate is simply related to the inherent stability of the pump.) Under these conditions it has been found that the pump provides a much more-stable and reliable flow than when the flow rate is constantly adjusted. In particular, even pumps which are considered "reliable" for pumping slurries of particulate matter are prone to plugging when the flow rate or stroke rate is adjusted such that the expected adjusted flow is not necessarily reliably obtained.

Further, there can be a not insignificant time lag in variation of flow rate in the pump, for example by varying the speed or stroke length of the pump.

In the process of the present invention, the amount of particulate matter passed to the reactor is controlled by providing a stream of additional diluent to the inlet of the reactor feed pump. Since the reactor feed pump operates at a constant volumetric flow rate, an increase in the flow of additional diluent will result in a corresponding decrease in a flow of the slurry in step (b) and result in an overall decrease in the amount of particulate matter being passed to the reactor.

In effect, since the volumetric flow rate is constant, the amount of particulate matter passed to the reactor can be directly correlated to the concentration of the particulate matter in the stream exiting the pump. Thus, an increase in the flow of additional diluent will result in a corresponding decrease in the concentration of the particulate matter in the stream being passed to the reactor, and vice versa.

The additional diluent, as with the diluent present in the slurry of step (a), may be any suitable liquid diluent. The exact choice of additional diluent may depend on the reaction to be operated, but for polymerisation reactions is usually a hydrocarbon liquid. The hydrocarbon diluent is usually an alkane or a mixture of alkanes. Preferred additional diluents are acyclic, aliphatic hydrocarbons having 3 to 8 carbon atoms, such as propane, n-butane, iso-butane, n-pentane, iso-pentane, n-hexane, iso-hexane, etc and mixtures thereof. Iso-butane is particularly preferred.

The diluent in step (a) may be the same or different to the additional diluent used. Catalysts suitable for polymerisation reactions, for example, are often provided commercially in the form of a concentrated slurry in a hydrocarbon liquid, such as mineral oil, and thus at least a portion of the diluent in the slurry in step (a) may comprise such hydrocarbons.

The slurry comprising particulate matter and diluent in step (a) (and as passed to the reactor feed pump in step (b)) may also be in the form of a concentrated slurry, but preferably has a concentration in the range 0.2 to 10 wt %, preferably 0.5 to 5 wt %, of particulate matter by weight of the total slurry, which is hereinafter referred to as a "dilute slurry". The dilute slurry may be prepared by diluting concentrated slurry, for example a commercially available slurry, or by addition of diluent to particulates provided as (dry) solid. Suitable diluents include one or more acyclic, aliphatic hydrocarbons having 3 to 8 carbon atoms, such as propane, n-butane, iso-butane, n-pentane, iso-pentane, n-hexane, iso-hexane, etc., such as described in WO 2005/077522. In this scenario, the diluent used for dilution is preferably the same as that used as the additional diluent.

The slurry comprising particulate matter and diluent in step (a) is usually provided in a suitable vessel, hereinafter referred to as the slurry feed vessel, upstream of the reactor feed pump. The slurry will usually be agitated in said vessel to minimise settling and maintain homogeneity. The slurry may be provided to the slurry feed vessel in a suitable form for subsequently passing to the reactor feed pump, for example from an earlier preparation step, or may be formed in said vessel by dilution of a more concentrated slurry of said particulate matter.

According to a preferred embodiment of the present invention, the slurry feed vessel is a vertically orientated, agitated, vessel and the slurry comprising particulate matter and diluent is withdrawn from the side of the vessel at a level above the vessel base. The vessel is generally in the shape of a vertically orientated cylinder. The top and base are "closed", usually by a curved section, and most especially by a section having the shape of a hemisphere or dome. The base section is hereinafter referred to as the "bottom head". The corresponding top section is hereinafter referred to as the "top head". In this embodiment of the present invention the slurry comprising particulate matter and diluent is withdrawn from the side wall of the vessel at a level above the bottom head. Most preferably, the cylindrical section of the vertically orientated vessel has a height H measured from where said section meets the bottom head to where it meets the top head, and the slurry comprising particulate matter and diluent is withdrawn from the side wall of the vessel at a level of from 0×H to 0.25×H, more preferably at a level of from 0.01×H to 0.1×H.

A withdrawal height above the bottom head is preferred as it limits potential plugging problems by drawing from a well-agitated section of the vessel versus the direct bottom of the vessel. Taking the stream from a well-agitated section of the vessel also ensures a more consistent concentration of the particulate matter in the diluent in the slurry passed to the reactor feed pump.

A pressure, preferably nitrogen, may be used in the slurry feed vessel to aid the flow of slurry from said vessel.

The additional diluent may generally be added to the slurry from step (a) at any point during which the slurry from step (a) is passed to the inlet of the reactor feed pump. In the scenario where the slurry in step (a) is provided in a slurry feed vessel, the additional diluent may be added at any point between the exit of the slurry feed vessel and the inlet of the reactor feed pump. Usually, step (b) comprises passing the slurry to the inlet of the reactor feed pump through a suitable pipe, and the additional diluent is added into said pipe at a junction therein.

The additional diluent is preferably added to the slurry from step (a) at a point relatively close prior to the reactor feed pump. Typically, the additional diluent is added to the slurry from step (a) within a length of 5 m of pipe prior to the inlet of the reactor feed pump.

The flow rate of the additional diluent may be controlled by any suitable valve or pump. Since the diluent is a liquid rather than a slurry the control of the flow of diluent, and hence the corresponding flow rate of slurry of particulate matter, is much simpler and more accurate than can be obtained by trying to directly control the flow rate of the slurry itself using a control valve on the slurry line or by using the reactor feed pump. Most particularly, since no solids are present in the additional diluent feed line the valve or pump is not prone to plugging.

Compared to variation of flow by variation of pump speed or stroke length, which can have not insignificant time lags before the variation takes effect, the process of the present invention therefore provides a very rapid and reliable change in the amount of particulate matter passed to the reactor. This is even more so compared to a process where dilution takes place only in an upstream vessel, such as the slurry feed vessel mentioned above, where there can be a very significant time lag before the dilution takes effect in the reactor. Further, in the event that it may be desired to significantly reduce the amount of particulate matter being passed to the reactor, if the dilution takes place in an upstream vessel containing a significant amount of the slurry, then it is usually necessary to add a significant amount of diluent to the vessel to effect the dilution. In some scenarios this may not be possible, for example if the vessel is already close to its capacity.

An advantage of more accurate control of the amount of particulate matter passed to the reactor is in more reliable control in the reactor. Although catalyst flow rates can be relatively small compared to the total reactor inventory, the effect of variations therein can be very significant, especially with catalysts which have "high" activity i.e. where small amounts cause high levels of reaction in the reactor.

Due to the additional diluent, the slurry exiting the reactor feed pump is more dilute than that in step (a). Typically said stream has a concentration in the range 0.1 to 5 wt % of particulate matter by weight of the total slurry. Further diluent may be added between the exit of the reactor feed pump and the reactor if required (but won't affect the amount of particulate matter fed to the reactor).

The process of the present invention is suitable for use with any pump suitable for pumping of slurries of particulate matter. Preferably, however, the reactor feed pump is a positive displacement pump, and more preferably a diaphragm pump.

Depending on the initial concentration of the slurry in step (a) the ratio of additional diluent to slurry passed to the reactor feed pump is typically in the range of from 1:20 to 20:1 by weight. The larger dilutions are generally required when a more concentrated initial slurry is utilised. The lower dilutions may be used where the initial slurry has already been diluted to slightly above the likely range of required concentration upstream and where it is desired to use the additional diluent for "fine tuning" of the amount of particulate matter passed to the reactor.

In particular, and in a second aspect, the present invention provides a process for providing a slurry of particulate matter to a reactor, comprising:
  a. providing a slurry comprising said particulate matter and diluent at a concentration of between 0.2 and 10 wt % of particulate matter by weight of the total slurry in a slurry feed vessel,
  b. passing said slurry and a stream of additional diluent at a ratio of additional diluent to slurry in the range of from 1:20 to 10:1 by weight to the inlet of a reactor feed pump from where the combined stream is then pumped to the reactor.

In this aspect of the present invention the dilution at the feed pump is used to "fine-time" the amount of particular matter passed to the reactor from a slurry which is itself already relatively dilute. Preferably, the stream of additional diluent is supplied at a ratio of additional diluent to slurry of less than 1:1, such as in the range of from 1:10 to 1:1 by weight. Preferably the slurry comprising said particulate matter and diluent provided in step (a) is at a concentration of between 0.5 and 5 wt % of particulate matter by weight of said total slurry. The slurry provided in step (a) may be prepared by any suitable method, such as described for the first aspect of the present invention. The slurry exiting the reactor feed pump in this second aspect typically has a concentration in the range 0.1 to 4.5 wt % of particulate matter by weight of the total slurry.

The preferred features of this second aspect of the invention are otherwise as for the first aspect e.g. the reactor feed pump being operated at an essentially constant volumetric flow rate.

In either the first or second aspect of the present invention any suitable method or mechanism may be used to control the flow of additional diluent, and hence the amount of particulate matter passed to the reactor. For example, a number of different process parameters may be utilised either singularly or in combination to control the flow of additional diluent.

In one embodiment, the flow of additional diluent may be controlled based on the flow of one or more reactants to the reactor. In the example of a reactor and a reaction for the polymerisation of olefins, the flow of additional diluent is preferably controlled based on the flow rate to the reactor of one or more of said olefins, for example based on the flow rate of ethylene in a process for the polymerisation of ethylene or based on the flow rate of propylene in a process for the polymerisation of propylene.

In another embodiment, the flow of additional diluent may be controlled based on the activity in the reactor. Suitable measurements of the activity which may be used will depend on the process itself, but could include reactant concentration in the reactor, reactant conversion, reaction temperature or production rate.

As one example, in the polymerisation of ethylene an increase in ethylene concentration in the reactor would generally be indicative of a lowering of activity (assuming ethylene or other feeds to the reactor have not been altered). A decrease in the additional diluent flow rate may then be effected in response, resulting in an increase in the amount of catalyst flowing to the reactor to increase the activity.

In a preferred aspect of such an embodiment, the additional diluent flow is controlled in order to maintain activity with a desired range.

In the process of the present invention it is possible to have more than one reactor feed pump pumping more than one slurry of particulate matter to a reactor.

For example, it is known in processes for the polymerisation of olefins in a slurry loop reactor to have two or more pumps feeding slurries of polymerisation catalyst to different points on the reactor loop. For example, a process in which both a plurality of monomer feeds and a plurality of catalyst feeds are utilised is described in WO 2004/24782. The present invention may be applied to such a process in a number of ways.

For example, in a loop with two pumps providing slurry to the reactor either or both may be operated with a stream of additional diluent.

In a particularly advantageous process with two or more pumps providing slurry to different points on a reactor the ability to control the amount of particular material provided by each pump by providing an additional diluent feed according to the process of the present invention to each results in a process in which the amount of particulate matter, such as catalyst, introduced into different parts of the reactor can be rapidly and accurately controlled. This provides the ability to control activity in different parts of the reactor.

It is also possible to utilise different reactor feed pumps to control the feed of two different types of particulate matter, for example two different catalysts. This could allow the possibility to tune different parts of the reactor to favour production of different products.

Further, other components may be fed to the reactor using suitable feed pumps. For example, many polymerisation catalysts may utilise one or more co-catalysts in conjunction therewith. Such co-catalysts may be fed with the "primary" catalyst by including such in the slurry comprising said particulate matter and diluent in step (a). Alternatively, and preferably, co-catalyst may be separately fed to the reactor, for example from a suitable co-catalyst feed vessel, and preferably utilising a further pump, such as a diaphragm pump, to pump the co-catalyst to the reactor. Examples of co-catalysts which may be used with polymerisation catalysts include aluminium alkyls such as triethylaluminium or TEAL, triisobutylaluminium or TIBAL, ethylaluminium dichloride or EADC, and diethylaluminium chloride or DEAC. Co-catalysts may be used "neat" or in diluted form.

The flow of co-catalyst may be controlled on the same or similar basis to the flow of catalyst to the reactor, as described above, or directly based on the concentration or amount of catalyst being passed to the reactor to maintain a particular co-catalyst/catalyst ratio.

Flow of materials in the process, such as flows of additional diluent and catalyst slurry to the reactor feed pump, and flow of co-catalyst (where used) to the reactor may be measured by suitable flow meters, such as coriolis-type mass flow meters.

The process is illustrated with respect to the FIGURE, wherein:

The FIGURE shows in schematic form a system for feeding a slurry of particulate matter according to the process of the present invention.

With respect to the FIGURE, there is shown a slurry feed vessel (1) in the form a vertically orientated vessel of generally cylindrical shape, equipped with an agitator (2). The base of the vessel is defined by an inverted dome (3). Particulate matter, which may be in solid form or in the form of a concentrated slurry is passed to the slurry feed vessel via line 4, and diluent is passed via line 5, to provide in the slurry feed vessel (1) a slurry comprising said particulate matter and diluent according to step (a) of the process of the present invention.

Additional diluent is passed via line 6 and control valve (7) into line 8 and then to the inlet of a reactor feed pump (9). Slurry comprising said particulate matter and diluent from slurry feed vessel (1) exits the vessel through line 10 and is also passed to the inlet of the reactor feed pump (9). The slurry exits the slurry feed vessel (1) at a point above the base (3).

The reactor feed pump operates at essentially constant volumetric flow rate and passes the combined and diluted slurry stream via line (11) to a reactor (12, not shown).

In the process of the present invention, in order to increase the amount of particulate matter being passed to the reactor (12), the control valve (7) is adjusted to reduce the flow of additional diluent (6). Because the reactor feed pump (9) operates at essentially constant volumetric flow rate this results in a corresponding increase in flow of the slurry comprising said particulate matter and diluent from slurry feed vessel (1) through line 9 to the slurry feed pump (9) to maintain the required volumetric feed rate, and hence an increase in amount of particulate matter passed to the reactor (12).

Other components, although not shown in the FIGURE, may be provided. For example, flow meters may be provided on one or more of lines 4,5,6,8,10 or 11 as required. Further, a separate "drain" is usually provided at the base of the slurry feed vessel (1) in order to allow its complete emptying.

The invention claimed is:

1. A process for providing a slurry of particulate matter to a reactor, comprising:
   a. providing a slurry comprising said particulate matter and diluent at a concentration of between 0.2 and 10 wt % of particulate matter by weight of the total slurry in a slurry feed vessel,
   b. passing said slurry and a stream of additional diluent at a ratio of additional diluent to slurry in the range of from 1:20 to 10:1 by weight to the inlet of a reactor feed pump from where the combined stream is then pumped to the reactor.

2. A process according to claim 1 wherein the particulate matter is a catalyst.

3. A process according to claim 2 wherein the particulate matter is a catalyst for the polymerisation of olefins.

4. A process according to claim 1 wherein the additional diluent is the same diluent as present in the slurry of step (a).

5. A process according to claim 1 wherein the additional diluent is iso-butane.

6. A process according to claim 1 wherein the slurry exiting the reactor feed pump has a concentration in the range 0.1 to 5 wt % of particulate matter by weight of the total slurry.

7. A process according to claim 1 wherein the ratio of additional diluent to slurry passed to the reactor feed pump is in the range of from 1:20 to 20:1 by weight.

8. A process according to claim 1 wherein the stream of additional diluent is supplied at a ratio of additional diluent to slurry of less than 1:1 by weight.

9. A process according to claim 1 wherein the slurry comprising said particulate matter and diluent provided in step (a) is at a concentration of between 0.5 and 5 wt % of particulate matter by weight of the total slurry.

10. A process according to claim 1 wherein the combined stream exiting the reactor feed pump has a concentration in the range 0.1 to 4.5 wt % of particulate matter by weight of the total slurry.

11. A process according to claim 1 wherein the particulate matter in the stream passed into the reactor comprises a polyolefin polymerization catalyst and the amount of catalyst is adjusted based on one or more of:
   1. the flow of one or more reactants to the reactor, and
   2. the catalyst activity in the reactor.

* * * * *

UNITED STATES PATENT AND TRADEMARK OFFICE
CERTIFICATE OF CORRECTION

PATENT NO.        : 8,383,741 B2
APPLICATION NO.   : 12/655684
DATED             : February 26, 2013
INVENTOR(S)       : Mark A. Gessner Page 1 of 1

It is certified that error appears in the above-identified patent and that said Letters Patent is hereby corrected as shown below:

In the Specification:

In Column 1,   lines 20-21,   change "6,980,971" to --6,908,971--.

In Column 1,   line 32,       change "6,980,971" to --6,908,971--.

In Column 1,   line 38,       change "Pumped" to --pumped--.

In Column 2,   line 19,       change "more-stable" to --more stable--.

Signed and Sealed this
Thirteenth Day of May, 2014

Michelle K. Lee
*Deputy Director of the United States Patent and Trademark Office*